May 25, 1948. E. J. HART 2,442,169
POWER TRANSMISSION
Filed Feb. 17, 1944 2 Sheets-Sheet 1
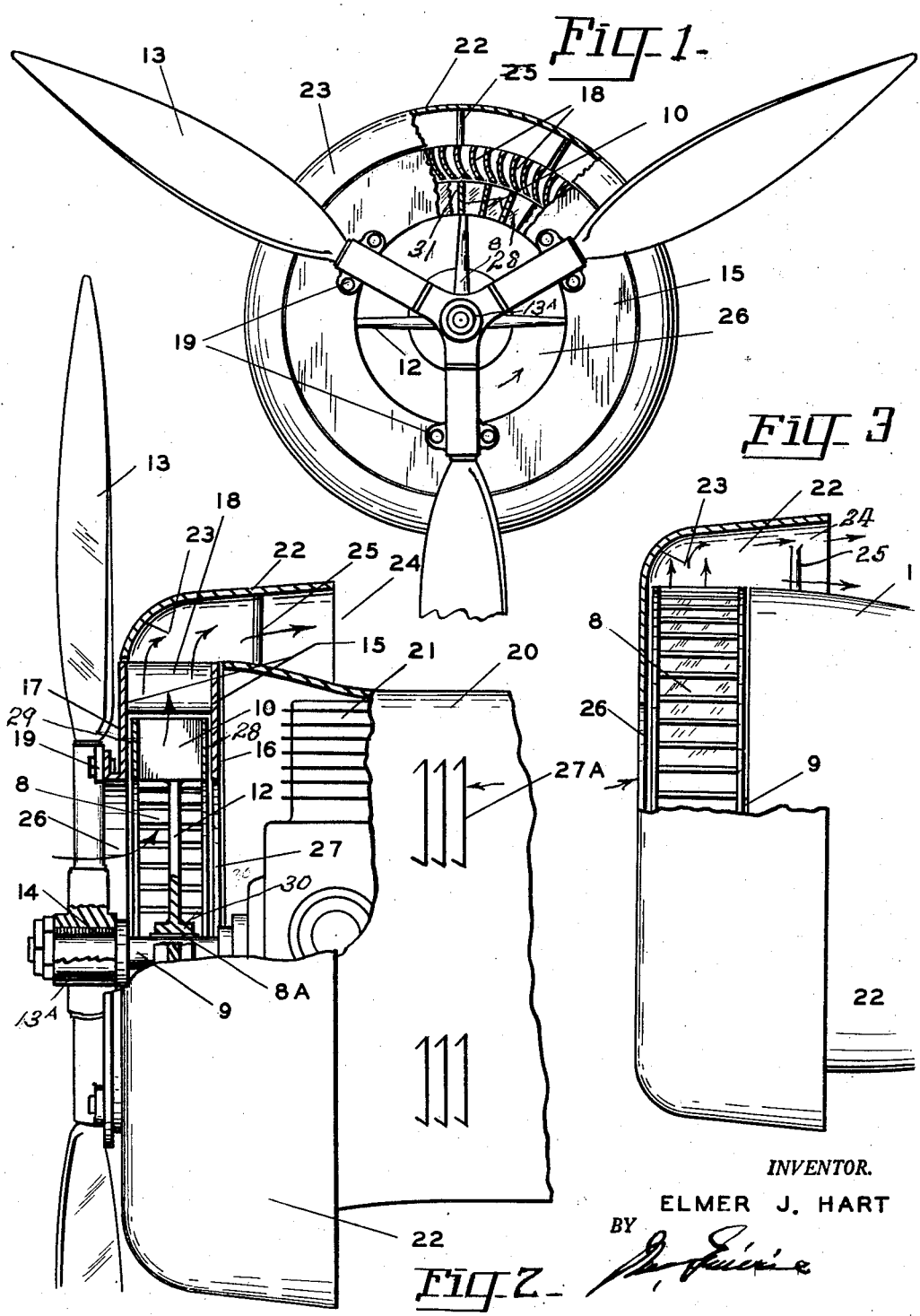
INVENTOR.
ELMER J. HART
BY May 25, 1948.  E. J. HART  2,442,169
POWER TRANSMISSION
Filed Feb. 17, 1944  2 Sheets-Sheet 2

INVENTOR.
ELMER J. HART

Patented May 25, 1948

2,442,169

UNITED STATES PATENT OFFICE 2,442,169

POWER TRANSMISSION

Elmer J. Hart, Vancouver, Wash.

Application February 17, 1944, Serial No. 522,774

3 Claims. (Cl. 170—135.5)

This invention relates to power transmissions and is particularly adapted for driving airplane propellers.

The primary object of the invention is to utilize air as a liquid power transmission medium to transfer rotation from one rotating element to another.

A further object of this invention is to utilize this air medium to assist in driving an airplane motor forward as the same is exhausted from the transmission unit.

By the using of high velocity air between a driving rotor and a driven rotor, a speed reduction can be obtained with the minimum amount of wear to the transmission.

These and other incidental objects will be apparent in the drawings, specification and claims.

Referring to the drawings:

Figure 1 is a front elevation of an airplane propeller including my new and improved power transmission, the propeller and transmission assembly being mounted to a conventional motor within a supporting housing.

Figure 2 is a fragmentary side sectional view of Figure 1, parts broken away for convenience of illustration.

Figure 3 is a modified form of embodiment of my new and improved power transmission.

Figure 4:
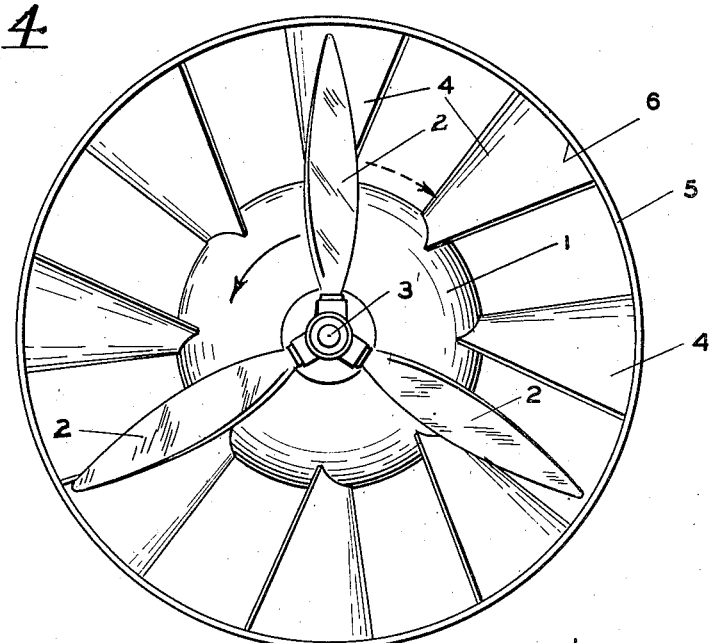
Figure 4 is a front view of my invention, illustrating a standard propeller in connection therewith.

With particular reference to Figures 1, 2 and 3, my transmission consists of a rotor 8, fixedly mounted to the motor shaft 9 by a suitable key 8A. This rotor turns with the motor shaft at all times. The motor 21 is mounted within the casing 20, which may be the fuselage of an airplane or it may be a motor housing mounted within the wings of an airplane. In any event, the casing or housing 20 is held rigidly to the plane and does not revolve relative to the plane.

The rotor 8 consists of radially mounted blades 10 being spaced apart by the parallel annular rings 28 and 29. The blades 10 and the rings 28 and 29 are mounted to the spokes 12, having a hub 30 keyed to the drive shaft 9. The assembly of the blades 10, 28 and 29 including the hub and spokes, is similar in construction to a squirrel cage blower, and in effect the assembly acts like a drum squirrel cage blower unit as commonly used in blowers of this type.

My invention consists of surrounding this rotor with a series of vanes 18, curved as illustrated in Figure 1. These vanes are fixedly mounted between the parallel side rings or end pieces 15. This unit resembles a turbine blade assembly and will hereinafter be described as a turbine drum 17, and is rotatably mounted to the drive shaft 9 in the following manner.

The propeller 13 has its hub 13A mounted to the shaft 9 through a suitable bearing 14 and rotates freely on the shaft. The propeller supports the turbine drum 15 by the holding lugs 19 being secured to the hub 26 of the turbine drum. The propeller holds the drum in spaced relationship to the rotor 8 so that the rotor 8 will revolve freely therein. An annular bell shaped ring 22 completely surrounds and is spaced apart from the housing 20. The forward end of the ring 22 is curved, as illustrated at 23, and is open at the rear 24 completely surrounding the housing 20 of the motor 21. The ring 22 is mounted to the motor housing 20 by spaced braces 25 completely around the housing.

I will now describe the operation of my power transmission. Free air enters through the central opening in the hub 26 of the turbine drum and into the rotor 8, which is being driven by the motor through the shaft 9 in the direction of the arrow. Air may also enter through the rear central opening 27 of the turbine drum 17 and a registered opening of the rotor 8 adjacent the motor 21. This air is forced out through the blades of the rotor 8 by centrifugal force, similar to a squirrel cage blower. The air enters between the vanes 18 of the turbine drum 17 at 31, and follows the curvature of the vanes as illustrated by the arrows, rotating the turbine drum in the direction of the rotor by the velocity of the air from the rotor acting upon the curved surfaces of the turbine drum vanes 18, imparting a rotation to the propeller 13 through the concentrically attached turbine drum. Further propelling force is exerted in the direction of flight by the action of the exhaust air striking the curved surface 23 of the annular ring or drum 22, forcing this exhaust air in the direction of the arrows through the opening 24 against atmospheric pressure. The reaction of this high velocity air being delivered by the rotor against the surface 23 and out the opening 24 against the atmospheric pressure creates a force against the surface 23 of the annular drum 22, forcing the unit forward and assisting the propeller 13 in driving the plane forward.

In Figure 3, I illustrate a modified form of my power transmission, wherein I depend entirely upon air velocity being directed against atmospheric pressure in order to drive the airplane forward similar to a rocket or jet plane. The rotor 8 is rotated by the motor at a high rate of speed, taking air in through the central opening indicated at 26' in the direction of the arrows and delivering the same against the curved surface 23 of the annular drum 22 and out the rear 24 thereof against atmospheric pressure in the region completely surrounding the housing of the motor unit.

As described before, the reaction of the high velocity air through the opening 24 tends to back up a pressure against the surface 23 by the back pressure developed by the atmospheric pressure against the high velocity escaping air.

Figure 5:
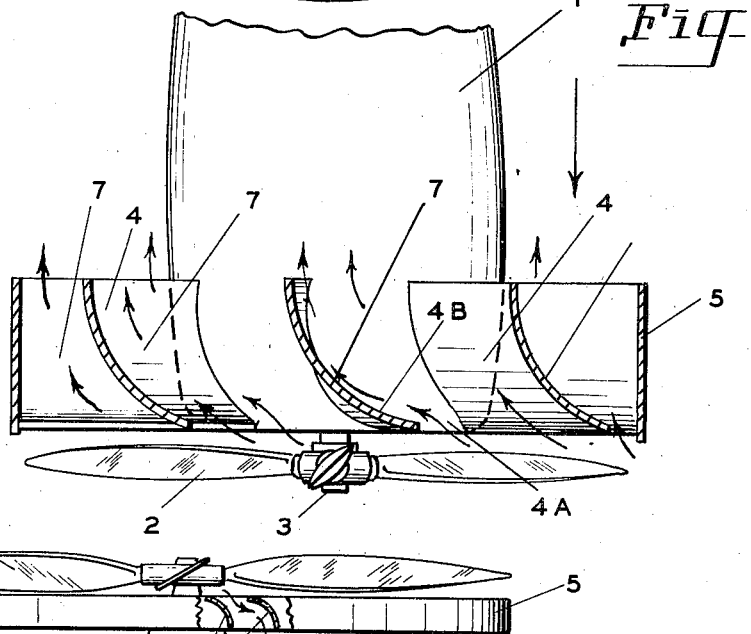
Figure 5 is a fragmentary view of a propeller and motor fuselage, parts broken away for convenience of illustration.

In the modified form of Figures 4 and 5, the invention is applied to the motor housing 1 of airplane motors, having the usual propellers 2 driven by the motor shaft 3 of the motor.

The invention consists of mounting specially formed vanes 4 radially around and to the housing 1. The housing 1 forms part of the airplane fuselage or wing and supports and houses the motor. The housing 1 does not revolve with the propeller but is fixed relative to the airplane. The outer ends of the vanes are braced by the ring band 5, secured to the vanes at 6; this band also controls air currents to be described later.

When the propeller of an airplane is driven by the motor, a backward torque is exerted against the fuselage of the airplane, which has been an objectionable feature in propeller action. My invention tends to eliminate this effect, at the same time using the energy of the slip stream of the propeller for useful forward propelling power.

The vanes 4 are shaped as illustrated so as to catch the slip stream from the propeller, as indicated by the arrows in the cup-like portion 7, exerting a rotating force against the vanes 4 in the direction of rotation of the propeller, overcoming the backward propeller torque exerted against the motor as described above. This force does not literally rotate the housing and vanes 4, but is an unseen existing force overcoming torque developed by the propeller.

In the operation of present-day airplane propellers, the propeller exerts a backward torque against the motor due to the power required to rotate the propeller. In present-day propeller action, a slip stream of air of high velocity is forced rearwardly and spirally from the propeller. My invention utilizes this spiral slip stream by causing it to enter the pockets 7 of the vanes 4, exerting a force against these vanes, overcoming propeller torque relative to the plane, eliminating the tendency for the plane to revolve about its longitudinal axis. Heretofore this torque effect was overcome by the plane controls, as for instance in the manipulation of the ailerons and tail surfaces, which tended to throw the plane out of balance. By using the revolving slip stream from the propeller against the surfaces of the vanes 4, the desired effect may be obtained without the use of the plane controls.

The efficiency of the propeller 2 is increased by its slip stream entering through the vanes 4 in the direction of the arrows. The slip stream tends to follow the rotation of the propeller, and as it enters between the vanes at 4A, it strikes the inner surface at 4B, developing a forward force against the vanes as it tries to escape rearwardly against the atmospheric pressure at the rear of the vanes. As the slip stream passes through the vanes, as just described, it straightens out parallel to the line of flight driving against the atmospheric pressure and reacting against the rear of the vanes at 7, creating considerable additional propelling force.

Figure 6:
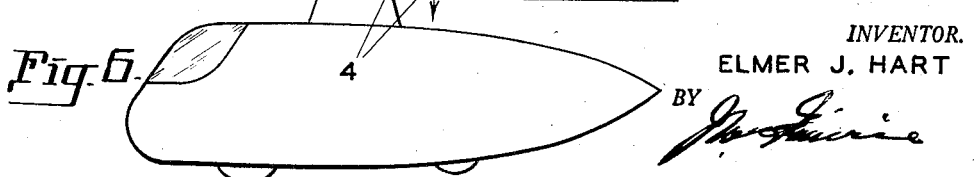
Figure 6 shows my invention adapted to a helicopter.

Referring to Figure 6, I have illustrated my invention applied to a helicopter, which it will be admirably adapted to, and which will eliminate torque which has heretofore been objectionable, requiring various kinds of stabilizers.

I do not wish to be limited to the use of my transmission in airplanes, as it may be adapted to other uses still coming within the scope of my claims. In many instances, the reaction of the air against atmospheric pressure would not be utilized, as for instance when the device is applied to vehicle transmission or transmissions used in factories and the like.

What I claim is:

1. A power transmission of the class described for airplane propellers, the same including in combination with an airplane itself otherwise conventional and carrying a motor mounted stationarily thereon, a forward propeller shaft driven rotatably by the motor, a propeller journalled co-axially and loosely but held longitudinally immovable on said shaft, a squirrel cage type rotary blower element fixedly mounted co-axially on said shaft rearwardly of the propeller and delivering air under pressure peripherally from normal outside air drawn centrally into said blower element upon power-rotation of said element, an annular turbine type rotor drum surrounding said blower element and connected operatively and concentrically to the propeller, said turbine rotor drum having an annular series of spaced vanes disposed in the region of its periphery and between which the air under pressure from the blower element is discharged, said vanes being formed so as to cause the air discharged from the blower element to rotate the turbine rotor drum and thereby rotate the propeller in the same direction of rotation as the propeller shaft, and stationary annular gatherer and deflector means for the discharged compressed air placed surroundingly and circumferentially about the turbine rotor drum for directing the air under pressure as delivered peripherally beyond the turbine rotor drum at a right angle to such delivery and rearwardly relative to the forward direction of flight of the airplane and into contact with the regional external atmosphere rearward of said gatherer and deflector means.

2. A power transmission, provision and arrangement as set forth in claim 1, wherein the outer stationary annular gatherer and deflector means for the air under pressure discharged from the turbine rotor drum comprises a cupped annular element having its discharge opening rearward and opposite to the direction of flight of the airplane with a concavo-convex annular front wall, the free circular lower edge of which is annularly contiguous to the peripheral front edge of the turbine rotor drum, the concave face of said front wall being interior of the element and producing an annular transversely curved corner fillet formation of substantial radius and merging roundingly with the annular wall of the element.

3. A power transmission, provision and arrangement as set forth in claim 1, wherein the rotary blower element is provided with an annular series of peripherally adjacent radial spaced apart blades and the turbine rotor drum is provided with an annular series of generally radially disposed but relatively inclined and more restrictedly spaced apart curved vanes rotatively surrounding the annular series of blower element blades and in close working relation thereto, the inclination and curvature of said turbine rotor drum vanes being such that the air under pressure passing therebetween and thereagainst effects rotation of the drum in the same direction as that of rotation of the blower element, and the stationary annular gatherer and deflector means for the air under pressure as discharged from the turbine rotor drum comprises a cupped annular element having its discharge opening rearward and opposite to the direction of flight of the airplane with a concavo-convex annular front wall, the free circular lower edge of which is annularly contiguous to the peripheral front edge of the turbine rotor drum and the concave face of said front wall being interior of the element and producing an annular transversely curved corner fillet formation of substantial radius merging roundingly with the annular wall of said deflector element.

ELMER J. HART.

REFERENCES CITED

The following references are of record in the file of this patent:

UNITED STATES PATENTS

| Number | Name | Date |
|---|---|---|
| 984,849 | Radcliffe | Feb. 21, 1911 |
| 1,017,564 | Lake | Feb. 13, 1912 |
| 1,336,946 | Dobbins | Apr. 13, 1920 |
| 1,431,683 | Ramsay | Oct. 10, 1922 |
| 1,456,765 | Cupp | May 29, 1923 |
| 1,692,397 | Wagner | Nov. 20, 1928 |
| 1,809,271 | Goddard | June 9, 1931 |
| 1,888,881 | Murphy | Nov. 22, 1932 |
| 1,896,222 | Chilton | Feb. 7, 1933 |
| 1,925,156 | Vaughn | Sept. 5, 1933 |
| 1,939,156 | Wright | Dec. 12, 1933 |
| 2,006,805 | Gwinn | July 2, 1935 |
| 2,107,897 | McMahane | Feb. 8, 1938 |
| 2,262,854 | Morris | Nov. 18, 1941 |
| 2,263,449 | Adler | Nov. 18, 1941 |

FOREIGN PATENTS

| Number | Country | Date |
|---|---|---|
| 36,463 | Netherlands | Apr. 15, 1935 |
| 341,426 | Germany | Mar. 8, 1918 |
| 536,238 | Great Britain | May 7, 1941 |
| 549,073 | Great Britain | Nov. 4, 1942 |